Oct. 25, 1932.  I. KITROSER  1,884,995
ROTATING PRISM APPARATUS
Filed Oct. 13, 1930
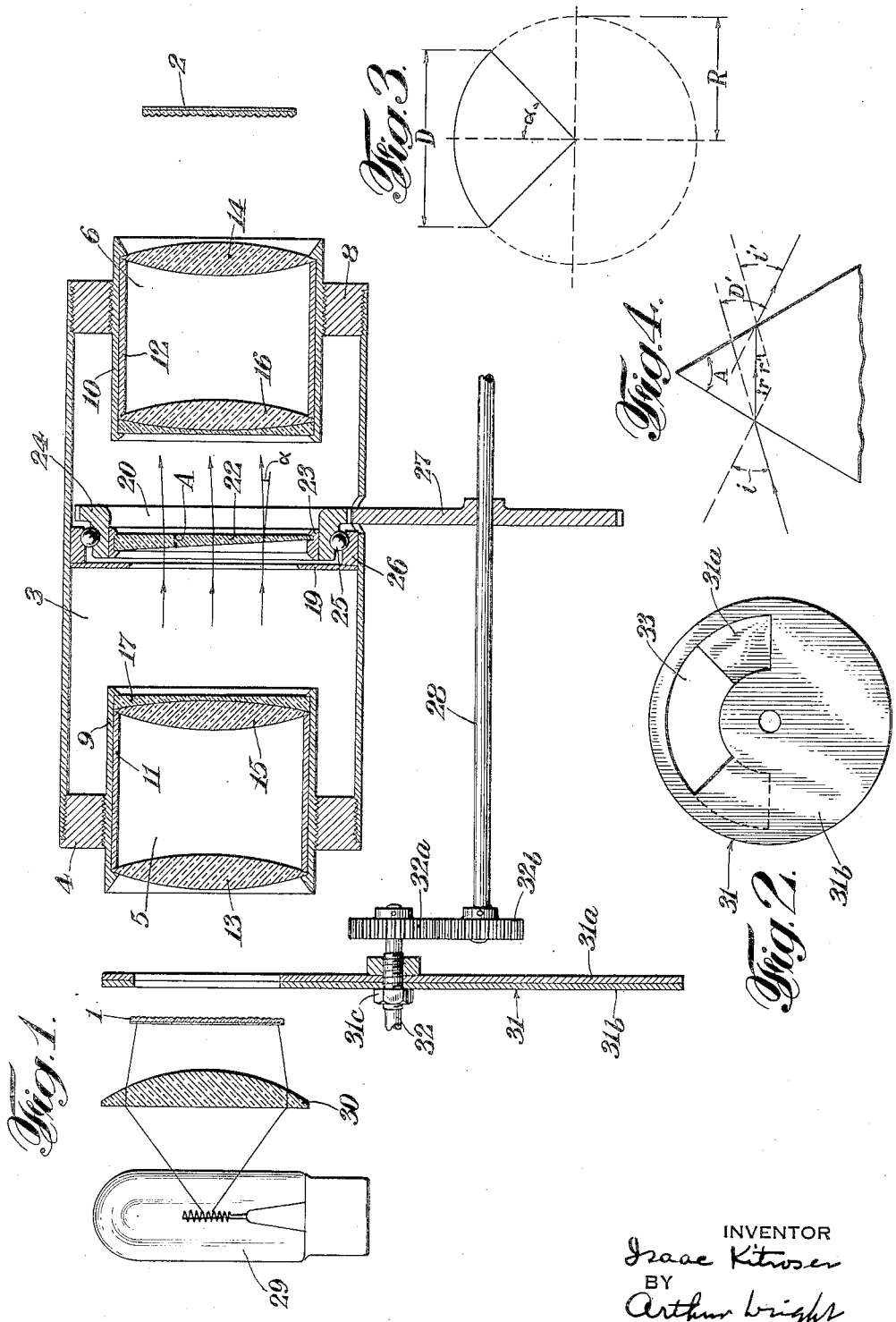
INVENTOR
Isaac Kitroser
BY
Arthur Bright
ATTORNEY Patented Oct. 25, 1932

1,884,995

UNITED STATES PATENT OFFICE

ISAAC KITROSER, OF PARIS, FRANCE, ASSIGNOR TO KELLER-DORIAN COLORFILM CORPORATION, OF NEW YORK, N. Y., A CORPORATION OF DELAWARE

ROTATING PRISM APPARATUS

Application filed October 13, 1930. Serial No. 488,308.

The present invention has as its object an improvement in the reproduction of cinematographic pictures taken on goffered films.

In my previous application upon method and apparatus for causing the reticulation and cloudy effects in goffered films in colors to disappear, Ser. No. 382,381, filed July 31, 1929, I have described means for causing the moiré effects to be eliminated during the reproduction of the films, in order thereby to obtain more perfect copies, inasmuch as the effect in using the apparatus therein for making copies is to practically eliminate the lines of gofferage on the virgin film during the copying, in view of the spreading of the individual points of the image during the making of the picture on the virgin film, at least the width of the lines of goffering. This elimination of the moiré effects is necessary as it is not practicable in making copies to exactly register the lines of goffering on the two films, one with another, while the copy is being made. It is found that when this procedure is followed the lines of moiré effects which are apparent in non-registering films disappear. But in the apparatus therein the means for eliminating said moiré effects is or may be arranged in such a position that it operates on convergent light rays, and that is not so desirable as to the quality of the images produced on the film on which the reproduction is made, and, furthermore, the deviation of the convergent rays gives an appreciable deviation of the rays at the diaphragm which is not very good for the colors obtained.

In the present invention, there is a different position for the light deviating means, as for example, the rotating prism, as it is placed substantially midway between the two parts of the objective, where it receives parallel light, and, therefore, the quality of the image is better and the colors are better.

While my invention is capable of embodiment in many different forms, by way of illustration I have shown only one embodiment of my invention in the accompanying drawing, in which—

Fig. 1 is a transverse section of an objective shown with the film to be reproduced and the film on which the reproduction is to be made;

Fig. 2 is an elevation of the shutter;

Fig. 3 is a diagram showing an explanation of the calculation for the rotating prism and shutter; and Fig. 4 is a diagram of the prism 19 showing diagrammatically the angles thereof.

In the drawing, I have shown a goffered film 1, as for example, with transverse lines of goffering, on which cinematographic pictures have been taken. A new film 2, on which the reproduction is to be made, is located at the other end of the objective. Between the films 1 and 2 there is located a photographic objective 3, comprising of a mounting 4 carrying two symmetric lens systems 5 and 6 held in place by screw-threaded rings 7 and 8 fastened in the mounting 4 and on tubes 9 and 10, respectively. Rings 11 and 12 therein hold their respective lenses in place. The lens systems 5 and 6 contain bi-convex lenses 13 and 14, bi-convex lenses 15 and 16 and plano-concave lenses 17 and 18. These lens systems 5 and 6 are of the usual well known construction, as shown in original Fig. 4 of the application of Andre Oswald, Ser. No. 17,724, filed March 23, 1925. For instance, the film 1 is in the focal plane of the objective 5, said objective preferably having a long focus to decrease cat's eye and petzwal curve effects and the film 2 is in the focal plane of objective 6, said objective preferably, also, having a long focus for the same reason, and a diaphragm 19 is in the focal planes of both objectives 5 and 6. Consequently, the luminous rays between the objectives 5 and 6 are parallel and the diaphragm 19, therefore, when seen from the positions of either of the films 1 and 2, appears to be at infinity. Each of the lens systems is preferably constructed so as to correct them in the usual way for achromatism, spherical aberration and astigmatism. Midway between the systems 5 and 6 I locate the diaphragm 19, and adjacent thereto, on either side of the diaphragm 19, as desired, I provide a prismatic device 20 for deviating the light ways, which deviates the image being taken on the film 2 so that each point thereof is made to take a circular path and thereby becomes enlarged into a circular area or a portion of a circle of larger size than said point. This has the effect of increasing the point of the image to such a size as to equal the size of each lenticular element of the goffering. This prismatic device 20 is, for example, comprised of a prism 21, which is mounted in a ring 23, carried in a gear ring 24, supported in ball-bearings 25, carried in a ball race 26, supported in the mounting 4. The gear ring 24 is rotated by a gear 27, on a shaft 28, driven at a uniform rate of speed from any suitable source of power and at any desired rate, as hereinafter referred to. For instance, the prismatic device 20 is preferably rotated 360° for each image of the cinematographic film.

With the said objective I provide an electric lamp 29 from which light passes through a collimatric lens 30, to provide parallel light for the film 1. In front of the film 1 there is a shutter 31, comprised of two relatively adjustable segments 31a and 31b held in position by a nut 31c, located on a shaft 32 having a gear 32a meshing with a gear 32b on the shaft 28, said shutter having an adjustable aperture 33 to permit the passage of light to the film 1. However, the prism 22 is so located that the thickest part of the periphery of the prism 22 is pointed in a direction which is the same as the direction of each line of goffering, when the shutter is in the middle of its period of exposure of the film, it being understood that the prism 22 and the shutter 31 turn the same number of revolutions per second, and one revolution for each image exposed on the film 2. This shutter is rotated uniformly, in any desired way, and at any desired rate of speed, according to the advancement of the film 2.

In order to eliminate the moiré effects during the making of the copies the prismatic device is given the required angle for the deviating of the rays, to the extent above referred to, that is to say, sufficiently so that while the film is being exposed at a particular image the displacement of a point on the image will equal the width of one line of goffering, or be at least that width.

For example, when objectives 5 and 6 have a focus of 100 mm., and when the shutter opening is 90° with a rotation of the shutter 360° for each 360° rotation of the prismatic device 20, and where the gofferage of both films is 20 lines per mm., the prismatic device must displace the image 1/20 mm.

Now referring to Fig. 3, in order to determine the angle of the prism 22, this can be determined as follows: The circle in said figure represents one cycle of the rotation of the prism 22 and also for the shutter 31, diagrammatically; the 90° angle therein represents the 90° opening of the shutter and ½ of said angle is 45° and R is the radius of the opening of the diaphragm 19. Therefore $$\frac{\frac{1}{40}}{R} = \cos 45°$$

$$R = \frac{1}{40 \times \cos 45°} = \frac{1}{40 \times 0.7604}$$

$$R = \frac{1}{30.416}$$

Now, if $i$ is the angle of incidence and $i'$ is the angle of emergence, as shown in Fig. 4; $r$ is the angle of the entering rays to the perpendicular of the surface entered in the prism; $r'$ is the angle of the rays in the prism to the perpendicular of the surface from which the rays leave the prism; $D'$ is the angle of deviation; $A$ is the angle of the prism and $n$ is the index of refraction of the glass prism. Then, according to the classic formulæ, $$\text{sine } i = n \text{ sine } r$$
$$\text{sine } i' = n \text{ sine } r'$$
$$r + r' = A$$
$$D' = i + i' - A$$

But as the angles are very small, substantially $$i = nr$$
$$i' = nr'$$
$$r + r' = A.$$

Therefore, as $$D' = \frac{R}{f}, \quad D' = \frac{\frac{1}{30.416}}{100} = 0.0003288.$$

Also, $$D' = (A(n-1))$$

and assuming that $$n = 1.5$$

$$A = \frac{D'}{n-1} = \frac{0.0003288}{0.5} = 0.0006576.$$

Therefore, the difference in thickness of the prism 19 assumed to have a diameter of 40 mm., is $$40 \times 0.0006576 = 0.026304 \text{ mm.}$$

Therefore, measured on the wave length of sodium light, this would be the following number of interference lines of sodium light where the wave length of sodium light $= 0.000589$.

Now according to the well known formula $$\Delta = \frac{\lambda}{2n} N$$

where $\Delta$ is the difference of the thickness, which is here 0.026304, $\lambda$ is the wave length of sodium light, 0.000589, $n$ is the index of refraction of the glass which is here 1.5, and N is the number of interference lines. Therefore $$N = \Delta \frac{2n}{\lambda} = \frac{0.026304}{0.000589} \times 2 \times 1.5 = 144.$$

The prism can thus be constructed with those dimensions. Then, a prism having been constructed with such a diameter and having a difference in thickness of about 144 interference lines, the said prism is put into the objective and as it is difficult to produce a prism having exactly said figure of difference of thicknesses of 144 lines, the apparatus is then operated to make a picture on the film 2 and the shutter elements 31a and 31b are slightly adjusted until the moiré effects entirely disappear. If the opening 33 in the shutter is made too wide the moiré effects will appear as will also be the case if the opening 33 is too narrow.

While I have described my invention above in detail, I wish it to be understood that many changes may be made in the same without departing from the spirit thereof.

I claim:

1. An apparatus adapted for copying goffered cinematographic films comprising a symmetrical objective, a diaphragm located between the two parts of the objective, a shutter, a prism located between the two parts of the objective and means to rotate the prism in unison with the shutter.

2. An apparatus adapted for copying goffered cinematographic films comprising a symmetrical objective, a diaphragm located between the two parts of the objective, a shutter and a rotating prism located adjacent the diaphragm adapted to displace the image sufficiently to eliminate the moiré effects on the film on which the picture is being made.

3. An apparatus adapted for copying goffered cinematographic films comprising a symmetrical objective, a diaphragm located between the two parts of the objective, a shutter and a rotating prism located adjacent the diaphragm adapted to displace the image a distance equal to the width of the goffering.

4. An apparatus adapted for copying goffered cinematographic films comprising a symmetrical objective, a diaphragm located between the two parts of the objective, a shutter and a rotating prism located adjacent the diaphragm, the prism being rotated in unison with the shutter.

5. An apparatus adapted for copying goffered cinematographic films comprising a symmetrical objective, a diaphragm located between the two parts of the objective, a shutter and a rotating prism located adjacent the diaphragm, the prism being rotated in unison with the shutter, adapted to displace the image sufficiently to eliminate the moiré effects on the film on which the picture is being made.

6. An apparatus adapted for copying goffered cinematographic films comprising a symmetrical objective, a diaphragm located between the two parts of the objective, a shutter and a rotating prism located adjacent the diaphragm, the prism being rotated in unison with the shutter, adapted to displace the image a distance equal to the width of the goffering.

7. An apparatus adapted for copying goffered cinematographic films comprising a symmetrical objective, a diaphragm located between the two parts of the objective, a shutter and a rotating prism located adjacent the diaphragm, the shutter opening and the deviating power of the prism being relatively coordinated so as to be adapted to displace the image sufficiently to eliminate the moiré effects on the film on which the picture is being made.

8. An apparatus adapted for copying goffered cinematographic films comprising a symmetrical objective, a diaphragm located between the two parts of the objective, a shutter and a rotating prism located adjacent the diaphragm, the shutter opening and the deviating power of the prism being relatively coordinated so as to be adapted to displace the image a distance equal to the width of the goffering.

9. An apparatus adapted for copying goffered cinematographic films comprising a symmetrical objective, a diaphragm located between the two parts of the objective, a shutter and a rotating prism located adjacent the diaphragm, the prism being rotated in unison with the shutter, the shutter opening and the deviating power of the prism being relatively coordinated so as to be adapted to displace the image sufficiently to eliminate the moiré effects on the film on which the picture is being made.

10. An apparatus adapted for copying goffered cinematographic films comprising a symmetrical objective, a diaphragm located between the two parts of the objective, a shutter and a rotating prism located adjacent the diaphragm, the prism being rotated in unison with the shutter, the shutter opening and the deviating power of the prism being relatively coordinated so as to be adapted to displace the image a distance equal to the width of the goffering.

11. An apparatus adapted for copying goffered cinematographic films comprising a symmetrical objective, a diaphragm located between the two parts of the objective, a shutter and a rotating prism located adjacent the diaphragm adapted to displace the image sufficiently to eliminate the moiré effects on the film on which the picture is being made, and the thicker end of the prism being directed in the direction of the individual lines of goffering in the middle of the period of light exposure by the shutter.

12. An apparatus adapted for copying goffered cinematographic films comprising a symmetrical objective, a diaphragm located between the two parts of the objective, a shutter and a rotating prism located adjacent the diaphragm adapted to displace the image a distance equal to the width of the goffering, and the thicker end of the prism being directed in the direction of the individual lines of goffering in the middle of the period of light exposure by the shutter.

13. An apparatus adapted for copying goffered cinematographic films comprising a symmetrical objective, a diaphragm located between the two parts of the objective, a shutter and a rotating prism located adjacent the diaphragm, the prism being rotated in unison with the shutter, adapted to displace the image sufficiently to eliminate the moiré effects on the film on which the picture is being made, and the thicker end of the prism being directed in the direction of the individual lines of goffering in the middle of the period of light exposure by the shutter.

14. An apparatus adapted for copying goffered cinematographic films comprising a symmetrical objective, a diaphragm located between the two parts of the objective, a shutter and a rotating prism located adjacent the diaphragm, the prism being rotated in unison with the shutter, adapted to displace the image a distance equal to the width of the goffering, and the thicker end of the prism being directed in the direction of the individual lines of goffering in the middle of the period of light exposure by the shutter.

15. An apparatus adapted for copying goffered cinematographic films comprising a symmetrical objective, a diaphragm located between the two parts of the objective, a shutter with an adjustable aperture, a prism located between the two parts of the objective and means to rotate the prism adapted to displace the image sufficiently to eliminate the moiré effects on the film on which the picture is being made.

16. An apparatus adapted for copying goffered cinematographic films comprising a symmetrical objective, a diaphragm located between the two parts of the objective, a shutter with an adjustable aperture and a rotating prism located adjacent the diaphragm adapted to displace the image sufficiently to eliminate the moiré effects on the film on which the picture is being made.

17. An apparatus adapted for copying goffered cinematographic films comprising a symmetrical objective, a diaphragm located between the two parts of the objective, a shutter with an adjustable aperture and a rotating prism located adjacent the diaphragm adapted to displace the image a distance equal to the width of the goffering.

ISAAC KITROSER.